United States Patent [19]

Lang et al.

[11] Patent Number: 5,896,256
[45] Date of Patent: Apr. 20, 1999

[54] VISUAL CAPACITY INDICATOR FOR DATA RECORDING SYSTEMS

[75] Inventors: Michael S. Lang, Reston, Va.; Louis H. Weiss, New York, N.Y.

[73] Assignees: Sony Corporation, Tokyo, Japan; Sony Electronics, Inc., Park Ridge, N.J.

[21] Appl. No.: 08/926,052

[22] Filed: Sep. 9, 1997

Related U.S. Application Data

[63] Continuation-in-part of application No. 08/778,604, Jan. 6, 1997.

[51] Int. Cl.[6] .................................................. G11B 23/03
[52] U.S. Cl. ........................................................ 360/133
[58] Field of Search ................................. 360/133, 132, 360/137; 369/291

[56] References Cited

U.S. PATENT DOCUMENTS

| | | | |
|---|---|---|---|
| 3,558,142 | 1/1971 | Poessel | 360/133 |
| 4,590,532 | 5/1986 | Saito | 360/133 |
| 5,465,381 | 11/1995 | Schmidt et al. | 360/133 |

FOREIGN PATENT DOCUMENTS

| | | | |
|---|---|---|---|
| 2101794 | 4/1983 | United Kingdom | 360/133 |

*Primary Examiner*—Allen T. Cao
*Attorney, Agent, or Firm*—Jay H. Maioli

[57] ABSTRACT

A visual capacity indicator for indicating to a user an approximate amount of disk space available for recording data on an attached disk recording device includes a display for displaying an amount of recording capacity currently available on the recording device and memory for storing information relating to the amount of recording capacity currently available on the recording device.

14 Claims, 7 Drawing Sheets

5,896,256

VISUAL CAPACITY INDICATOR FOR DATA RECORDING SYSTEMS

CROSS-REFERENCE

This is a continuation in part of application Ser. No. 08/778,604 filed Jan. 6, 1997 pending.

BACKGROUND

The present invention relates generally to data recording media. More particularly, the present invention relates to a visual capacity indicator for indicating an amount of recording space available for recording on a recording medium.

With the widespread use of computers in the "Information Age" currently taking place, various types of data storage devices are in use. These data storage devices include magnetic disks, optical disks, and magneto-optical disks. For example, floppy disks are common devices for storing data to and from computers, and recordable/rewritable optical and magneto-optical disks (CD-Rs) and recordable/rewritable digital versatile disks (DVD-Rs) are expected to increase in popularity in the near future.

Storage devices such as floppy disks, CD-Rs, and DVD-Rs are generally small in size, lightweight, reasonably affordable and can store well over 1 Mbyte of information on each disk. These storage devices are also easily transferred from one computer to another and, therefore, are a convenient means to transfer data between various computers without requiring a network system or a modem device.

A common storage device is the so-called 3.5-inch floppy disk. A perspective view of a typical 3.5-inch floppy disk 1 is shown in FIG. 1. A disk-shaped recording medium 2 is housed in a rigid cartridge 3 that provides reasonable protection from inadvertent physical damage. The cartridge 3 is formed of an upper half 31 and a lower half 32 and includes a sliding cover plate or shutter 6 that selectively covers an aperture 5 in the upper half 31 of the cartridge 3 for accessing an upper side of the recording medium 2 housed therein. The cover plate 6 provides limited access to the recording medium 2 housed in the cartridge 3. A spring mechanism 7 biases the cover plate 6 to a normally closed position covering the aperture 5. When the floppy disk 1 is inserted into a disk drive unit (not shown), the cover plate 6 is moved to expose the aperture 5 and a portion of the recording medium 2.

In order to determine how much disk space is available for recording for a conventional floppy disk, such as that shown in FIG. 1, a user must insert the floppy disk into the disk drive of a computer and then input commands instructing the computer to electronically access the recording medium in the floppy disk to retrieve information relating to the amount of disk space available for recording data. The computer responds by displaying the information on a display monitor.

OBJECTS AND SUMMARY OF THE INVENTION

A feature lacking in typical storage devices is a visual capacity indicator for enabling a user to easily ascertain how much storage space has been used and how much empty storage space remains available for storing data. Such a capacity indicator would allow the user to visually check whether there is enough room available to store a particular data file without having to electronically access the recording medium to retrieve capacity information stored thereon. This operation can take a considerable amount of time depending on how many CD-Rs, for example, the user must check before one is found that has adequate storage space available. Such a capacity indicator would also save the user from wasting time trying to store the data file onto a CD-R, for example, only to receive a message that the CD-R does not have sufficient empty disk space.

In view of the above-mentioned deficiencies in typical storage devices, it is an object of the present invention to provide a visual capacity indicator for visually indicating to a user approximately how much storage space is available on an attached storage device, such as a floppy disk, a CD-R, or a DVD-R, for storing data.

It is another object of the present invention to provide a CD-R with an attached visual capacity indicator for visually indicating to a user approximately how much storage space is available on the CD-R for recording data.

It is yet another object of the present invention to provide a floppy disk cartridge with a visual capacity indicator for visually indicating to a user approximately how much disk space is available on an attached floppy disk recording medium for recording data.

It is an additional object of the present invention to provide a visual capacity indicator that is moved mechanically and/or magnetically to indicate approximately how much empty storage space is available on an attached recording medium.

It is also an object of the present invention to provide a visual capacity indicator with an electronic display for indicating approximately how much empty storage space is available on an attached recording medium.

According to an aspect of the present invention, a recording medium is housed in a cartridge having a capacity indicator located at a peripheral region thereof to minimize interference of the capacity indicator with regular operation of the recording medium. The capacity indicator is easily visible through a window in the cartridge so that a user can easily assess an approximate amount of empty storage space available on the recording medium. Moving means move the capacity indicator to a position that reflects the amount of available storage space remaining on the recording medium. The moving means may be mechanical and/or magnetic.

According to another aspect of the present invention, a recordable disk, such as a CD-R or a DVD-R, has a capacity indicator located in a central region of the disk away from a recording region of the disk. Moving means update the capacity indicator to reflect a current disk capacity available for recording data. The moving means may be mechanical and/or magnetic. Alternatively, the capacity indicator may include a power source, such as a battery or a solar cell, located within the central region of the disk for enabling the capacity indicator to electrically display the current disk capacity.

According to yet another aspect of the present invention, when a user inserts a disk recording device into a drive unit of a computer in order to record/erase data or reproduce data, the computer determines whether a capacity indicator is present. If it is determined that a capacity indicator is present, the computer reads the capacity indicator and also electronically accesses the recording medium to find its true capacity. If the difference between the indicated capacity and the true capacity is less than 10%, for example, the computer performs an operation of recording/erasing data according to the user's instructions, and then the drive unit adjusts the capacity indicator to reflect the current amount of storage space available on the disk recording device.

DETAILED DESCRIPTION OF PREFERRED EMBODIMENTS

Figure 1:
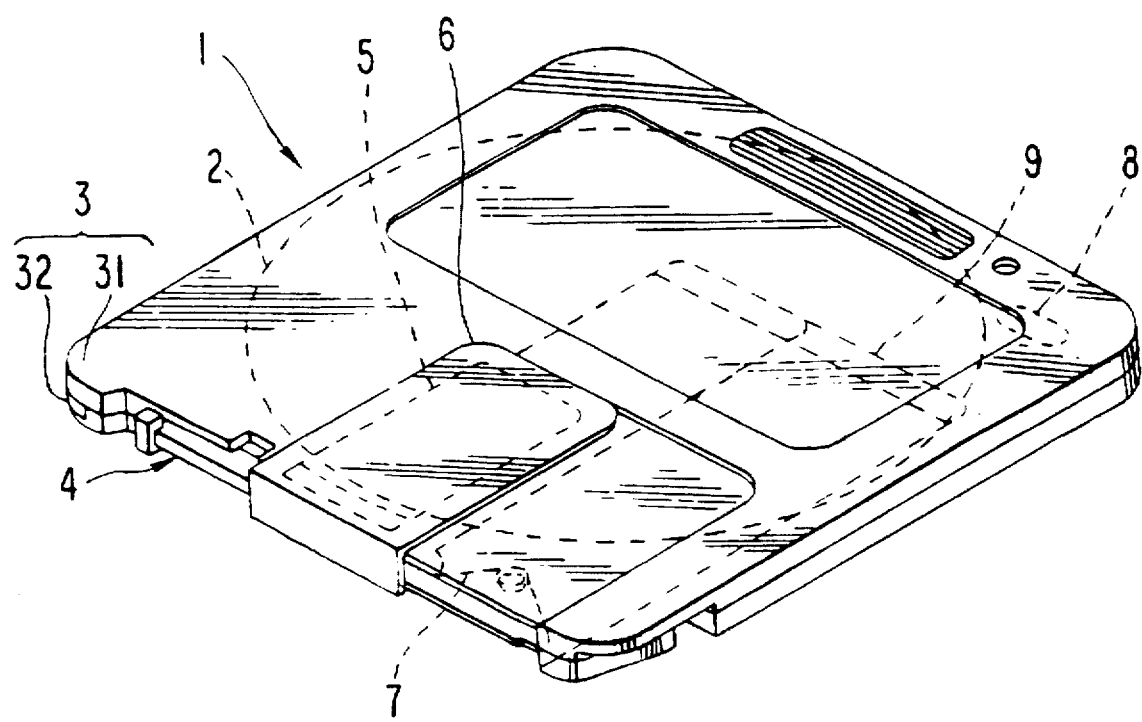
FIG. 1 is a perspective view of a typical 3.5-inch floppy disk cartridge.

A preferred embodiment of a capacity indicator for various recording media according to the present invention is described below with reference to the accompanying drawings, in which like reference numerals represent the same or similar elements.

Figure 2:
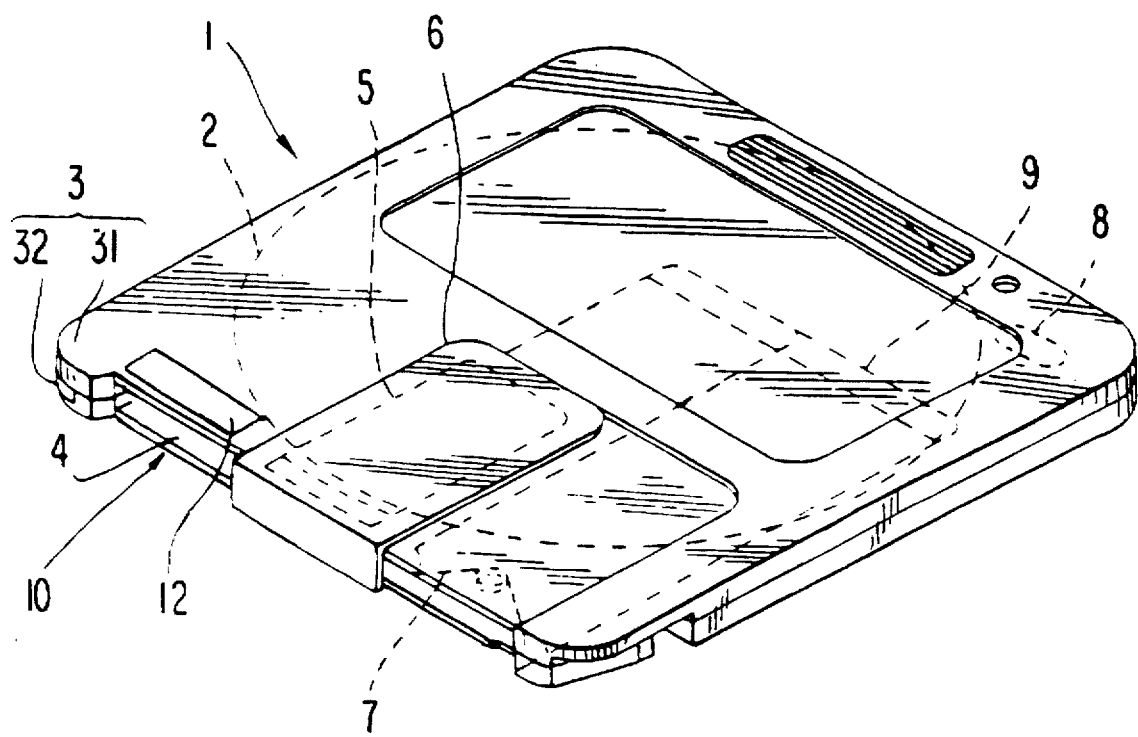
FIG. 2 is a perspective view of a floppy disk cartridge according to an embodiment of the present invention.

FIG. 2 is a perspective view of a floppy disk 1 according to an embodiment of the present invention. A recording medium 2 is housed in a rigid cartridge 3 formed of an upper half 31 and a lower half 32. A sliding cover plate 6 located towards a peripheral edge of the cartridge 3 selectively covers an aperture 5 formed in the upper half 31 of the cartridge 3 for accessing an upper side of the recording medium 2 housed therein. For double-sided recording media, the cover plate 6 may also be used to cover an aperture (not shown) formed in the lower half 32 of the cartridge 3 for accessing a lower side of the recording medium 2.

The cover plate 6 provides limited access to the recording medium 2 housed in the cartridge 3. A spring mechanism 7 located on one side of the cover plate 6 biases the cover plate 6 to a normally closed position covering the aperture 5. When the floppy disk 1 is inserted into a disk drive unit, the cover plate 6 is moved towards the spring mechanism 7 to expose the aperture 5 and a portion of the recording medium 2 beneath the aperture 5 so that the recording medium 2 can be accessed by a read/write head of the disk drive unit (not shown).

The floppy disk 3 also includes a capacity indicator 10 for indicating to a user an approximate amount of disk space available for recording data on the recording medium 2. The capacity indicator 10 is located towards the peripheral edge of the cartridge 3 where the cover plate 6 is located on a side of the cover plate 6 opposite to the spring mechanism 7. An access opening 4 at the peripheral edge of the cartridge 3 where the cover plate 6 is located and proximate the capacity indicator 10 allows a small external arm (not shown) to enter the cartridge 3 to adjust the capacity indicator 10.

Figure 3:
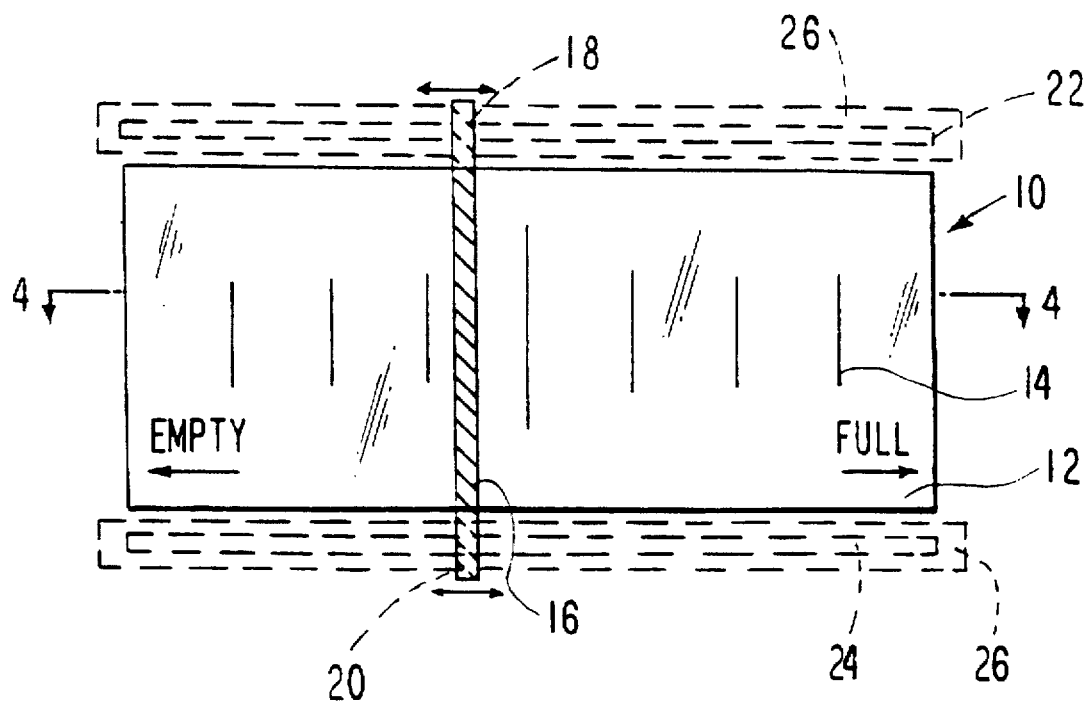
FIG. 3 is a plan view of a capacity indicator according to an embodiment of the present invention.

FIG. 3 shows a plan view of the capacity indicator 10 of FIG. 2. A window 12 made from a transparent material provides visual access to an indicator needle 16 below. The window includes indicia 14 showing various capacity levels ranging from empty to full. The indicator needle 16 is slidably engaged with a guide rail 22.

Figure 4:
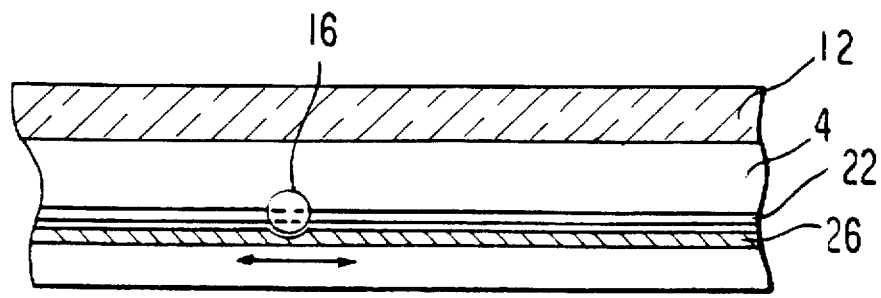
FIG. 4 is a cross-sectional view taken along line 4—4 of FIG. 3.

FIG. 4 is a cross-sectional view of a portion of the capacity indicator 10 taken along line 4—4 of FIG. 3.

According to a preferred embodiment, the indicator needle 16 has a first end 18 slidably engaged with the guide rail 22 and a second end 20 slidably engaged with a second guide rail 24 to maintain the indicator needle 16 in a parallel relation with the indicia 14.

The indicator needle 16 may be positioned to show capacity by a variety of methods. For example, a positioning arm (not shown) extending from the disk drive in which the floppy disk 1 is inserted may be used to move the indicator needle 16 by engaging and moving the first end 18 closest to the access opening 4, with the second end 20 sliding along with the first end 18. The indicator needle 16 is prevented from arbitrarily sliding on the guide rails 22, 24 by friction from a lint-free cloth 26 located below the indicator needle 16 and gently contacting the indicator needle 16. Alternatively, the positioning arm may extend through a slot (not shown) located in the upper half 31 of the cartridge 3 and positioned parallel to and above the one or both of the guide rails 22, 24 to engage and slide the indicator needle 16 to a proper position that indicates disk capacity.

The indicator needle 16 may also be positioned using magnetic means (not shown). For example, the second end 20 of the indicator needle 16, or the end closest to the recording medium 2, may include a ferromagnetic material that moves in response to an induced magnetic field from an electromagnetic device controlled by the disk drive unit. The disk drive unit energizes the electromagnetic device to pick up the indicator needle 16 and de-energizes the electromagnetic device when the indicator needle 16 is at a position indicating the current disk capacity. The electromagnetic device need not extend into the cartridge 3 through the access opening 4 but instead may provide a sufficient localized magnetic field to move the indicator needle 16 from outside of the cartridge 3. The electromagnetic device can be located on the same arm as the magnetic recording head of the disk drive unit. Alternatively, the magnetic recording head itself may serve as the electromagnetic device for positioning the indicator needle 16.

According to a preferred embodiment, after the magnetic recording head performs an operation of recording or erasing data to or from the recording medium 2, the magnetic recording head is then used to position the indicator needle 16 by generating a magnetic field to engage the indicator needle 16, moving the indicator needle 16 to a position reflecting the available recording capacity of the recording medium 2, and removing the magnetic field to disengage the indicator needle 16.

Figure 5:
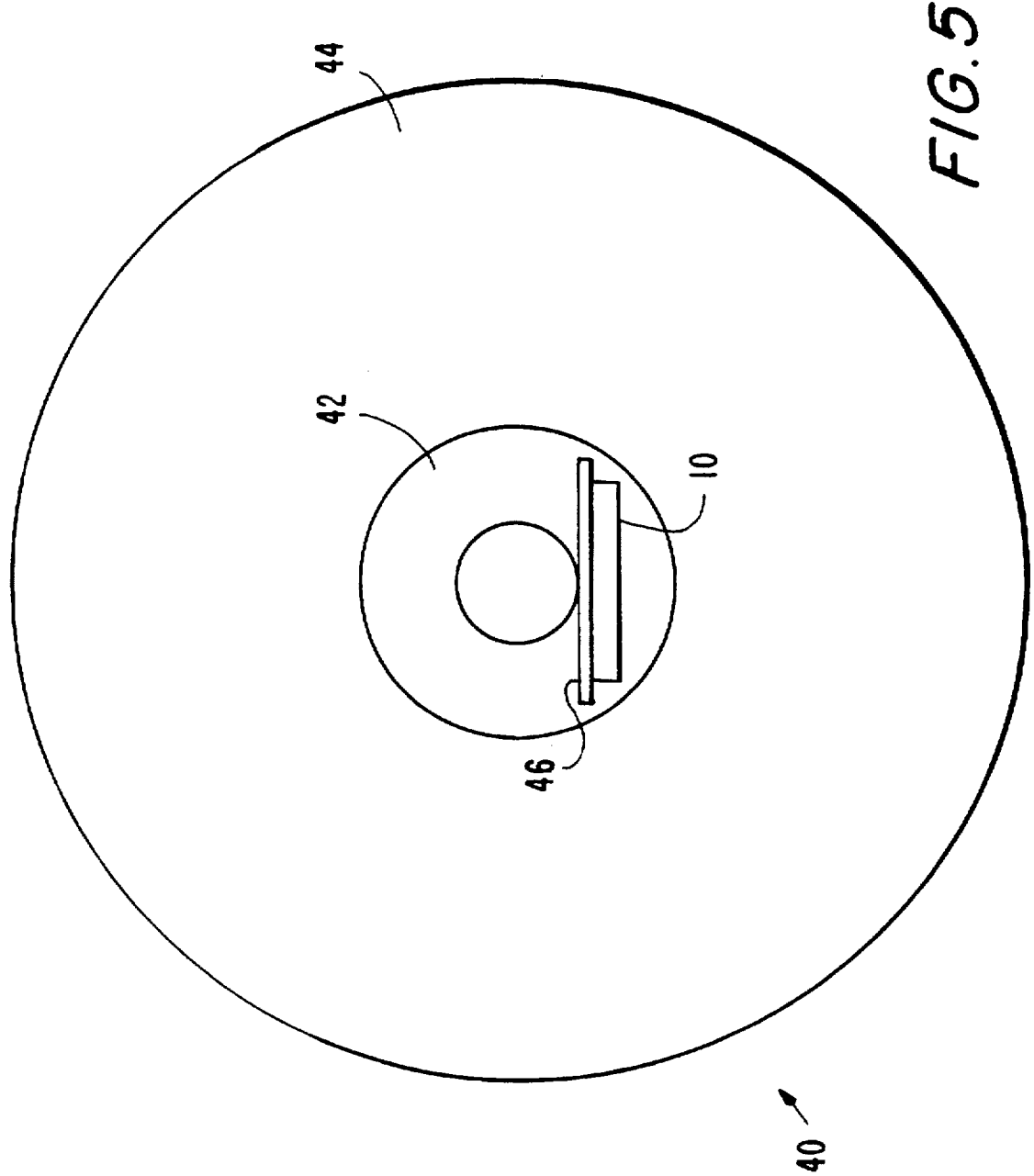
FIG. 5 is a plan view of a disk with a capacity indicator located at a central region of the disk according to an embodiment of the present invention.

According to another embodiment of the present invention, the capacity indicator 10 shown in FIG. 3 is used in conjunction with a disk recording device 40 such as a CD-R or a DVD-R, for example. FIG. 5 shows a plan view of the disk 40 with the capacity indicator 10 located in a central region 42 of the disk 40 away from a recording region 44 of the disk 40. A slit opening 46 located above the capacity indicator 10 and oriented parallel to a sliding direction of the capacity indicator 10 enables an external arm (not shown), extending from the disk drive in which the disk 40 is inserted, to access the indicator needle 16 of the capacity indicator 10 to slide the indicator needle 16 to a position that reflects the amount of space available on the disk 40 for recording data.

Alternatively, the indicator needle 16 may be positioned using magnetic means (not shown), as described above.

Figure 6:
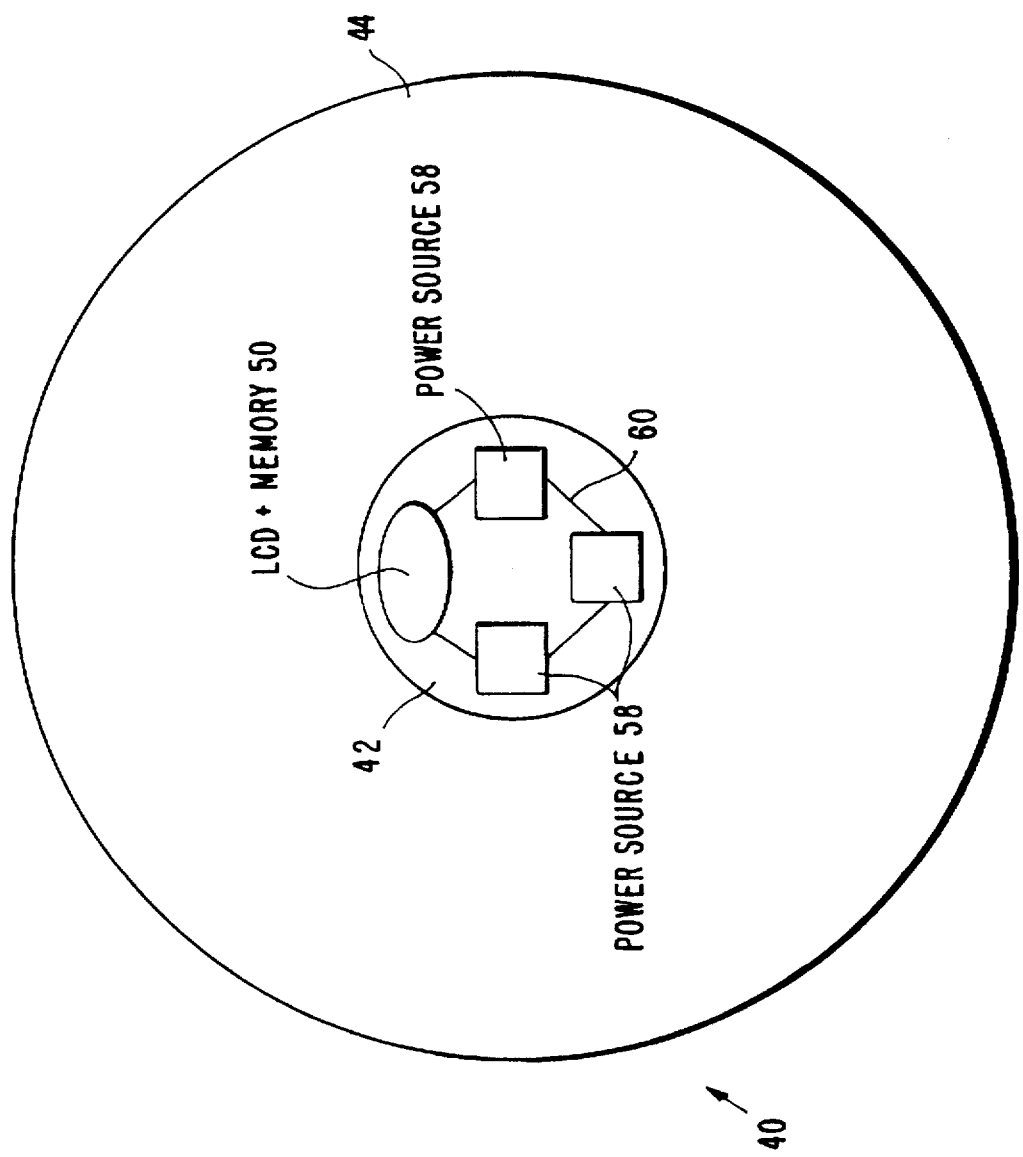
FIG. 6 is a plan view of a disk with a capacity indicator located in a central region of the disk according to an embodiment of the present invention.

According to yet another embodiment of the present invention, a capacity indicator 50 is used in conjunction with a disk recording device 40 such as a CD-R or a DVD-R, for example. FIG. 6 shows plan view of the disk 40 with the capacity indicator 50 located in a central region 42 of the disk 40 away from a recording region 44 of the disk 40.

Figure 7:
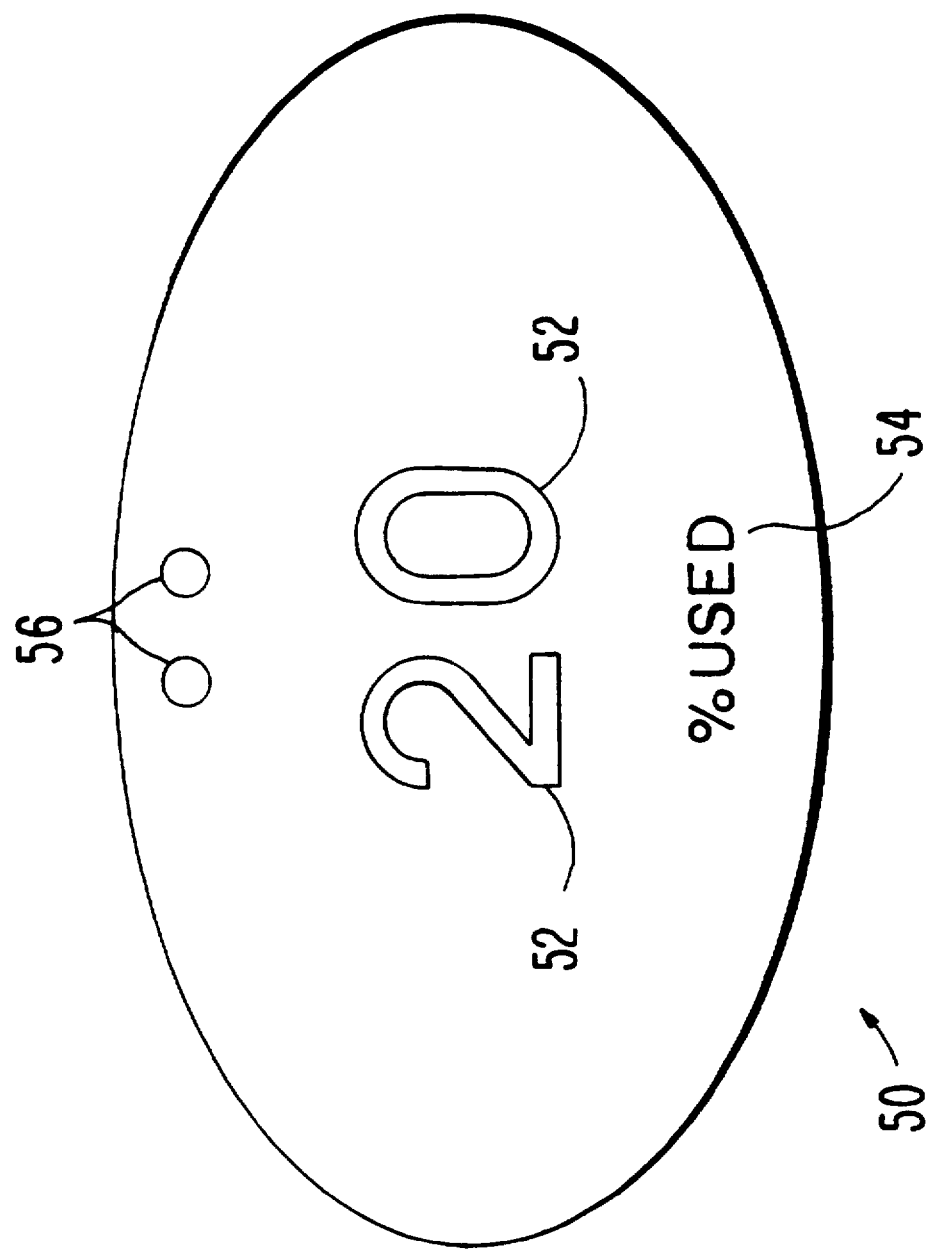
FIG. 7 is a plan view of the capacity indicator of FIG. 6.

The capacity indicator 50 includes a non-volatile memory, such as programmable read-only-memory (PROM), for storing disk capacity information, and a display 52 for displaying the disk capacity information, as schematically shown in FIG. 7. Informational indicia 54 may also be present on the capacity indicator 50. A plurality of recessed contacts 56 enable the non-volatile memory to be programmed to store the disk capacity information. Programming means, such as an external arm (not shown) extending from the disk drive in which the disk 40 is inserted, update the disk capacity information through the recessed contacts 56.

According to a preferred embodiment, the display 52 is a low-power liquid crystal display and the capacity indicator 50 is connected to at least one power source 58 for powering the liquid crystal display. Preferably, the power source 58 is a solar cell that converts light into electrical power for powering the liquid crystal display. Electrical interconnections, shown typically at 60 in FIG. 6, interconnect the power source 58 and the capacity indicator 50.

Figure 8:
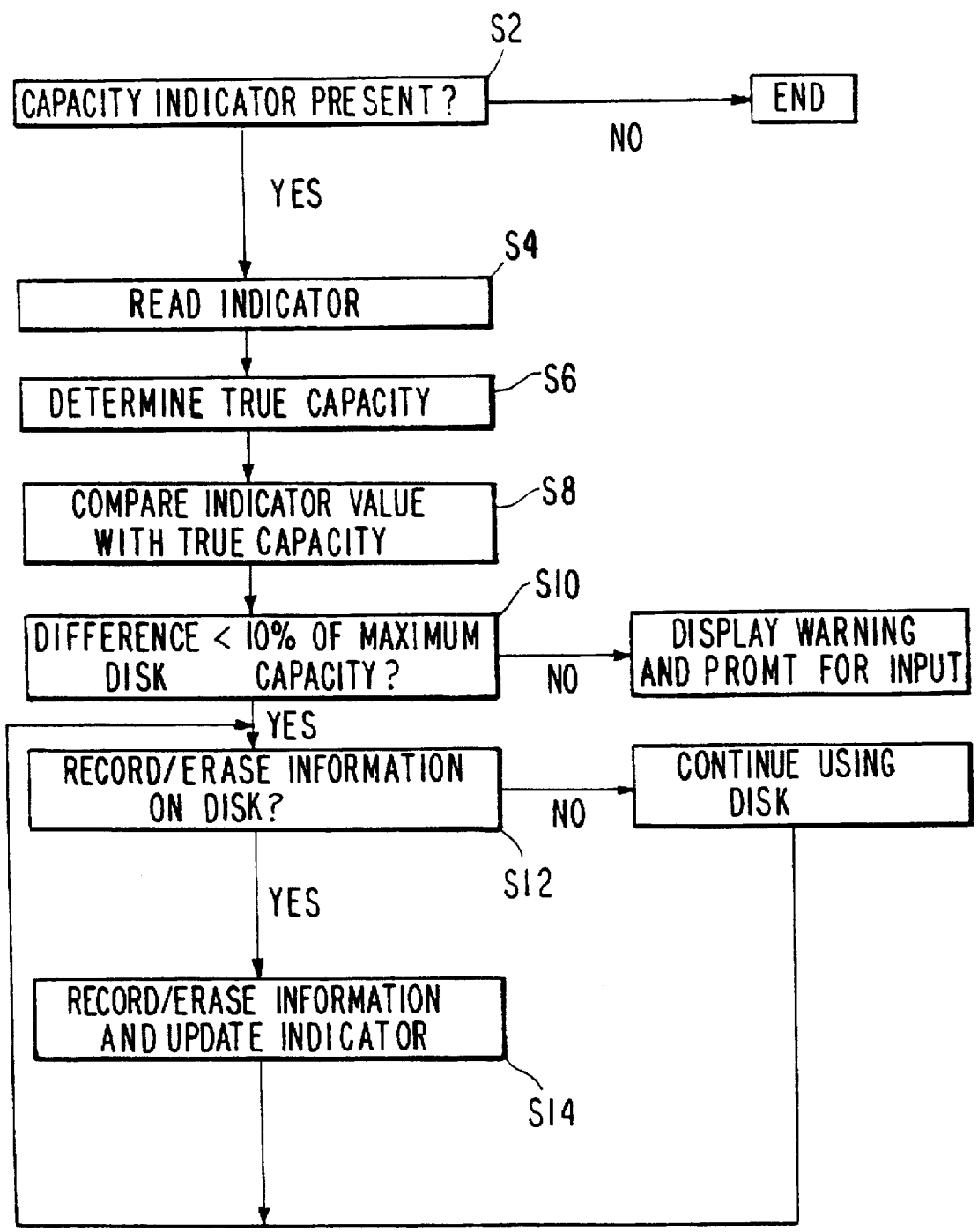
FIG. 8 is a chart showing a method of updating a capacity indicator according to an embodiment of the present invention.

FIG. 8 is a flow chart of a method for updating a capacity indicator according to an embodiment of the present invention. First, when the disk drive unit of a computer initially accesses a disk, such as a floppy disk, a CD-R, or a DVD-R, which has been inserted therein it is determined at S2 whether a capacity indicator is present. If the answer is no, the disk is used as a conventional disk without a capacity indicator. If the answer is yes, an indicated capacity on the capacity indicator is read at S4, and then the recording medium 2 is scanned to determine its true capacity at S6. At S8, a comparison is made between the indicated capacity and the true capacity and, at S10, it is determined whether a difference between the indicated capacity and true capacity is less than 10% of the maximum capacity of the recording medium. If the answer is no, a warning regarding the discrepancy is displayed on a monitor of the computer, and a prompt for more information is also displayed. If the answer is yes, it is determined whether a record and/or erase operation has been performed at S12. If a record and/or erase operation has been performed, the capacity indicator position is updated at S14. If no record and/or erase operation has been performed, the disk performs as a conventional one, such as reproducing recorded data, for example, and the capacity indicator position is not updated until a record and/or erase operation is performed.

The embodiments described above are illustrative examples of the present invention and it should not be construed that the present invention is limited to those particular embodiments. Various changes and modifications may be effected by one skilled in the art without departing from the spirit or scope of the invention as defined in the appended claims.

For example, the access opening 4 and the capacity indicator 10 need not be located towards the peripheral edge of the cartridge 3 where the cover plate 6 is located but instead may be located elsewhere on the cartridge 3. Also, because an access opening is not necessary if an electromagnetic device is used to move the indicator needle 16, the cartridge 3 need not contain an access opening.

What is claimed is:

1. A recordable rigid disk assembly, comprising:
   a housing containing a rigid disk including a central region;
   a recording area peripherally surrounding the central region; and
   a visual capacity indicator located in the central region for visually indicating an amount of disk space currently available for recording data in the recording area, the visual capacity indicator including:
      an electronic display for displaying the amount of disk space currently available for recording data in the recording area,
      memory means for storing information relating to the amount of disk space currently available for recording data in the recording area, and
      a power source for powering the electronic display.

2. The recordable rigid disk assembly according to claim 1, wherein the display is a liquid crystal display and the power source is a solar cell.

3. The recordable rigid disk assembly according to claim 2, wherein the memory means is a non-volatile memory.

4. The recordable rigid disk assembly according to claim 3, further including electrical contacts for receiving signals for programming the non-volatile memory.

5. The recordable rigid disk according to claim 1, wherein the recordable disk is a CD-R.

6. The recordable rigid disk according to claim 1, wherein the recordable disk is a DVD-R.

7. A recordable rigid disk, comprising:
   a housing containing a rigid disk including a central region;
   a recording area peripherally surrounding the central region; and
   a visual capacity indicator located in the central region for visually indicating an amount of disk space currently available for recording data in the recording area, the visual capacity indicator including:
      a transparent window formed in the housing, indicia located on the window for representing capacity levels of the recording area ranging from empty to full,
      a longitudinal guide rail attached to the housing, and
      an indicator needle for indicating the amount of disk space available in the recording area, the indicator needle being visible through the window and slidably engaged with the longitudinal guide rail.

8. The recordable rigid disk according to claim 7, wherein the housing includes an access opening providing access to position the indicator needle.

9. The recordable rigid disk according to claim 7, wherein the indicator needle contains a ferromagnetic material for enabling the indicator needle to be positioned using an electromagnetic device.

10. The recordable rigid disk according to claim 7, wherein the recordable disk is a CD-R.

11. The recordable rigid disk according to claim 7, wherein the recordable disk is a DVD-R.

12. A method for indicating disk capacity on a visual capacity indicator of a recordable rigid disk, the method comprising the steps of:
   recording data on or erasing data from a disk; and
   updating an indicated disk capacity on a visual capacity indicator attached to the disk indicating an amount of disk space currently available for recording data on the disk following the step of recording data on or erasing data from the disk by moving an indicator needle of the visual capacity indicator to a position indicating the amount of disk space available by engaging the indicator needle with an external arm, and laterally sliding the indicator needle along a longitudinal guide rail to the position indicating the amount of disk space available.

13. The method for indicating disk capacity on a visual capacity indicator of a recordable rigid disk according to claim 12, wherein the recordable disk is a CD-R.

14. The method for indicating disk capacity on a visual capacity indicator of a recordable rigid disk according to claim 12, wherein the recordable disk is a DVD-R.

* * * * *